United States Patent [19]

Lubinsky et al.

[11] Patent Number: 4,988,873
[45] Date of Patent: Jan. 29, 1991

[54] APPARATUS AND METHOD FOR SCANNING TRANSPARENT PHOSPHORS

[75] Inventors: Anthony R. Lubinsky, Webster; Robert W. Kulpinski, Rochester, both of N.Y.

[73] Assignee: Eastman Kodak Company, Rochester, N.Y.

[21] Appl. No.: 414,546

[22] Filed: Sep. 29, 1989

[51] Int. Cl.⁵ .............................................. G03B 42/00
[52] U.S. Cl. ................................. 250/327.2; 250/484.1
[58] Field of Search ........................... 250/327.2, 484.1

[56] References Cited

U.S. PATENT DOCUMENTS 3,859,527 1/1975 Luckey ............................ 250/327.2
4,733,090 3/1988 DeBoer et al. ................... 250/484.1
4,778,995 10/1988 Kuplinski et al. ................ 250/327.2
4,797,543 1/1989 Caruthers, Jr. ................... 250/327.2

Primary Examiner—Constantine Hannaher
Assistant Examiner—Jacob Eisenberg
Attorney, Agent, or Firm—Warren W. Kurz

[57] ABSTRACT

Apparatus for scan-stimulating a transparent image-storage phosphor to recover a latent image previously formed therein by, for example, an imagewise exposure to x-radiation. Such apparatus includes a source of stimulating radiation and optical apparatus for causing the stimulating radiation to appear (to the storage phosphor) to diverge from the same position in space as the source (x-ray) used to form the latent image in the phosphor. By scanning the phosphor with stimulating radiation propagating along the same path as that traversed by the imagewise-exposing radiation, the recovered image is significantly sharper than prior art techniques.

7 Claims, 2 Drawing Sheets

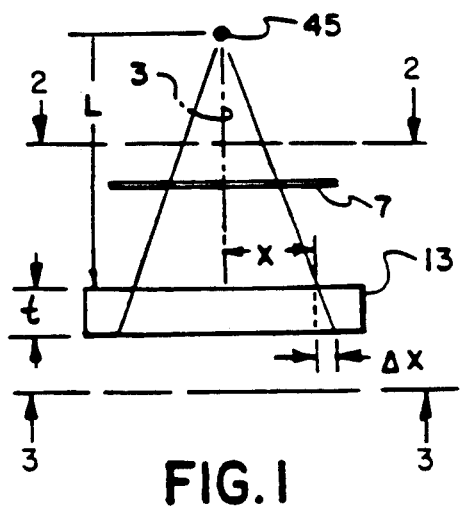
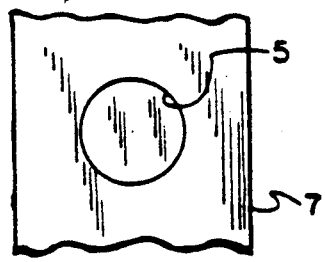
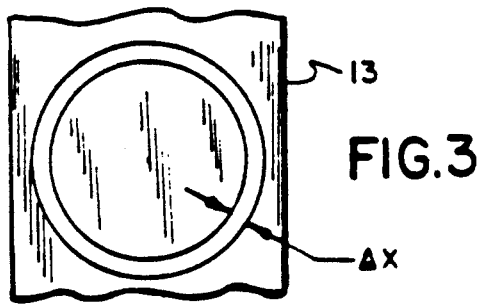
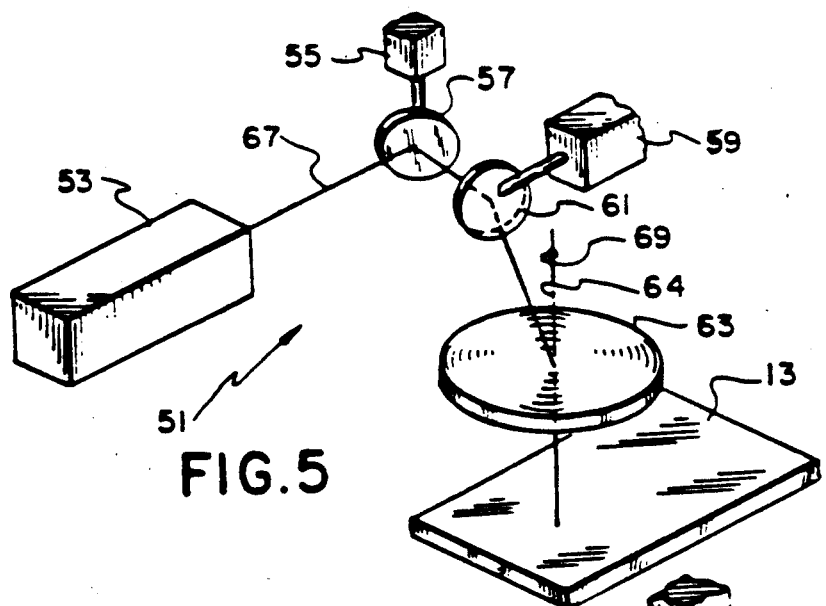
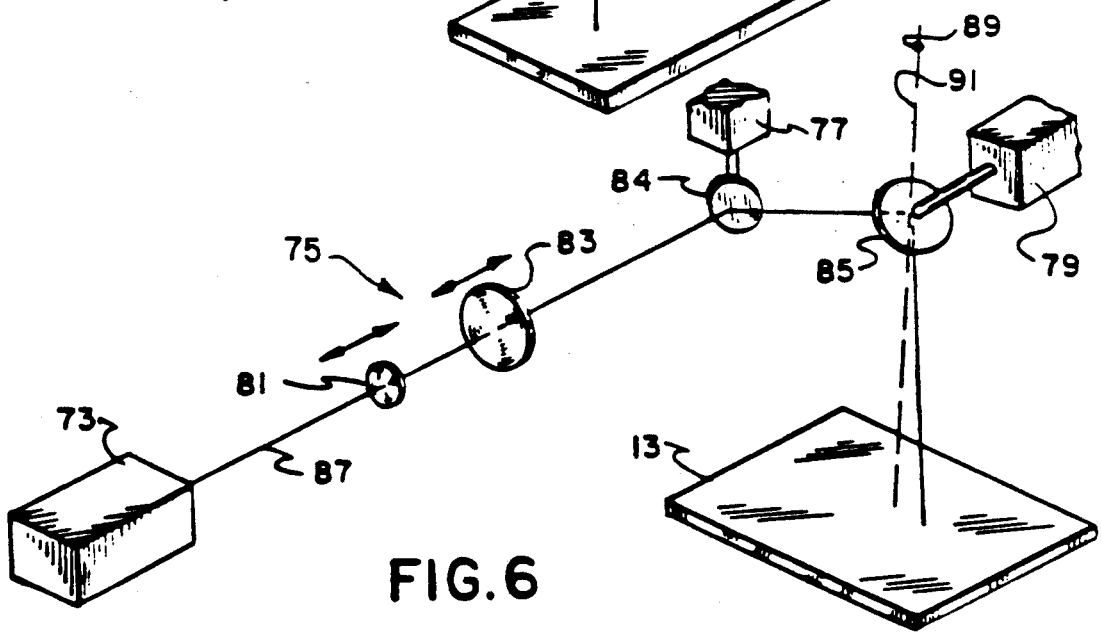

APPARATUS AND METHOD FOR SCANNING TRANSPARENT PHOSPHORS

BACKGROUND OF THE INVENTION

This invention relates to the field of radiography. More particularly, it relates to improvements in apparatus for scan-stimulating an image-storage phosphor to recover a latent image previously formed therein by, for example, an imagewise exposure to x-radiation.

U.S. Pat. No. 3,859,527 (Re. No. 31,847) to G. W. Luckey discloses the use of storage phosphors as a recording medium in radiography. The recording medium is first exposed to x-rays of wavelength $\lambda_1$ to form a latent image in the phosphor. The incoming flux of x-rays produces a number of excited electrons and holes in the phosphor, some of which are trapped in long-lived (storage) states within the phosphor. At a later time the phosphor may be destructively scanned by stimulating radiation of wavelength $\lambda_2$ to produce a luminescent emission of wavelength $\lambda_3$, which is proportional to the original x-ray exposure. The term "destructively" is used herein to denote that the phosphor is discharged by the stimulating radiation, and that only a finite amount of stimulated radiation is emitted by the phosphor, regardless of the quantity of stimulating radiation applied. The terms "storage phosphor(s)" and "phosphor(s)" as used herein, refer to phosphors that, upon stimulation, destructively release emitted radiation.

The above described system uses conventional x-ray exposure equipment. However, in place of the screen and film of conventional radiography a recording medium in the form of a photo-stimulable luminescent storage phosphor is used. After exposure the recording medium is scanned, in a raster pattern by a laser beam deflected by an oscillating or rotating scanning mirror, and the luminescent emission at wavelength $\lambda_3$ is collected and detected by a photodetector such as a photomultiplier tube and converted to digital information which is transmitted to a computer which, in turn, processes the image. U.S. Pat. No. 4,778,995 to R. W. Kulpinski et. al. discloses in schematic form the basic method of scanning, in which the laser is fixed, the laser beam is deflected in the fast or line scan direction (in this case by a rotating polygon mirror), and the recording medium advanced in the slow or page scan direction by a suitable sheet drive mechanism.

Though not used for scanning phosphors, scanning systems other than the type described in U.S. Pat. No. 4,778,995 are known. Stroke marking, used for both laser engraving (evaporating material up to 0.25 mm deep) and annealing (causing a color change by localized instantaneous heating of material without removing material from the surface) utilizes a fixed laser, a microprocessor controlled dual galvanometer system, and flat field focusing optics. The beam is deflected by galvanometer mirrors in both the x and y directions before it is focused onto the workpiece. Scanning systems are also known in which the flat field optics, such as used in stroke marking, have been eliminated. In an x-y laser printing system disclosed by General Scanning, Watertown, Mass., the flat field optics have been eliminated by modifying the x and y focus as the beam moves across the image plane by using a "dynamic focusing telescope" consisting of two moving focusing lenses. The slow scan or y focus is corrected by a lens which is adjusted in steps as the beam moves down the image plane. The fast scan or x focus is accomplished with what is identified as a "resonant lens mover". In both of the above described systems, the image plane remains stationary. It is not known to use the above described systems for scanning stimulable storage phosphors whether turbid or transparent.

Currently, optically turbid (non transparent) storage phosphors are used as the recording media in digital radiography systems. However, there are certain advantages that an optically transparent phosphor has over a turbid phosphor. Since the MTF (Modulation Transfer Function; a measure of the ability of the system to record details) of the transparent phosphor imaging system is limited mainly by the effective size of the scanning beam of stimulating radiation, which may be adjusted to a desired size, the MTF may be made much higher than in a comparable turbid phosphor system. In addition, the x-ray absorption of the sheet may be increased by making it thicker, without increasing the effective size of the scanning beam. In this way the signal-to-noise ratio of the x-ray detector may be improved. In the conventional turbid storage phosphor sheets, the thickness is limited by the spreading of the scanning beam in the turbid phosphor. Optically transparent phosphors are disclosed in U.S. Pat. No. 4,733,090 to C. D. DeBoer et. al.

In the practice of radiography, the distance between the x-ray tube and the recording medium is limited. The intensity of the x-ray flux decreases with the square of the distance from the tube. Thus, to maintain a constant x-ray exposure at the recording medium, as the distance is increased, the tube current or exposure time or both must be increased. However, the current cannot be increased indefinitely because of the resultant heating of the tube anode. The tube-to-recording medium distances in use typically range from 50 to 150 cm, depending on the type of examination, exposure time and technique used.

The combination of the high resolution (or MTF) and the thickness of an optically transparent phosphor creates a new problem, namely, resultant images are blurred due to: (1) the obliqueness of the x-rays, which form the edge of the shadow of an object, relative to the surface of the phosphor, even if the source of x-rays (i.e., the tube anode) is a point; and (2) the fact that the direction of the radiation used to scan the phosphor is not the same as the direction of the x-radiation. With reference to FIGS. 1–3, L is the anode to transparent phosphor distance; t, the thickness of the phosphor 13; x, the distance from the centerline 3 at which a particular x-ray strikes phosphor 13; and $\Delta X$, the amount of blurring of a line 5 in thin opaque sheet 7. As an example, if L=80 cm, x=8 cm and t=2 mm, then:

$$\Delta X = (x/L)\, t = 200 \ \mu m$$

This is obviously large, compared to the diameter of the scanning beam, which may be 100 $\mu$m or less.

While C. D. DeBoer et. al. recognized that ideally the beam of the scanning laser should follow the path of the x-radiation, they suggested no solution to the above described problem. Conventional scanning in a raster pattern does not solve the problem. The object of the present invention is to solve the above described problem.

SUMMARY OF THE INVENTION

Apparatus for scanning a transparent phosphor including, a source of stimulating radiation, means for supporting the transparent phosphor and apparatus for causing the radiation from the stimulating source to diverge from the same position in space relative to the transparent phosphor during scanning as the source of x-radiation during the formation of the latent image in the transparent phosphor. In one embodiment, the apparatus for causing the radiation to diverge from the desired position is a negative optical element, preferably a plano-concave lens. The radius of curvature of the lens is $$R = \left[\frac{n-1}{n}\right]L$$

where n is the index of refraction of the lens and L is the perpendicular distance between the transparent phosphor and the source of x-radiation used to form the latent image. The plano-convex lens and the phosphor have the same index of refraction at the wavelength of the stimulating radiation. The plano-convex lens is, typically, placed on top of the transparent phosphor and moves with the phosphor during the scanning. A telecentric lens is placed between the source of stimulating radiation and the plano-convex lens. In the alternate methods for achieving the same result, the apparatus for causing the radiation to diverge includes first means for scanning in the fast direction, second means for scanning in the slow direction and third means for focusing the stimulating radiation on the transparent phosphor. The first scanning means can be a galvanometer; the second scanning means, a second galvanometer; and the means for focusing a flat field lens. Alternately, the means for focusing can be a dynamic fast focus lens system and a slow focus lens system, one of the first and second scanning means a galvanometer, and the other scanning means a resonant galvanometer.

BRIEF DESCRIPTION OF THE DRAWINGS

FIG. 1 is a schematic diagram illustrating the relationship between the source of x-radiation, tube to recording medium distance, phosphor thickness and amount of blurring;

FIG. 2 is a view of the object of FIG. 1, taken along line A—A;

FIG. 3 is a view of the image of the object FIG. 2, taken along line B—B of FIG. 1;

FIG. 5 is a schematic of an alternate embodiment for accomplishing the object of the invention; and FIG. 6 is a schematic of a third system for accomplishing the object of the invention.

DESCRIPTION OF THE PREFERRED EMBODIMENTS

Figure 4:
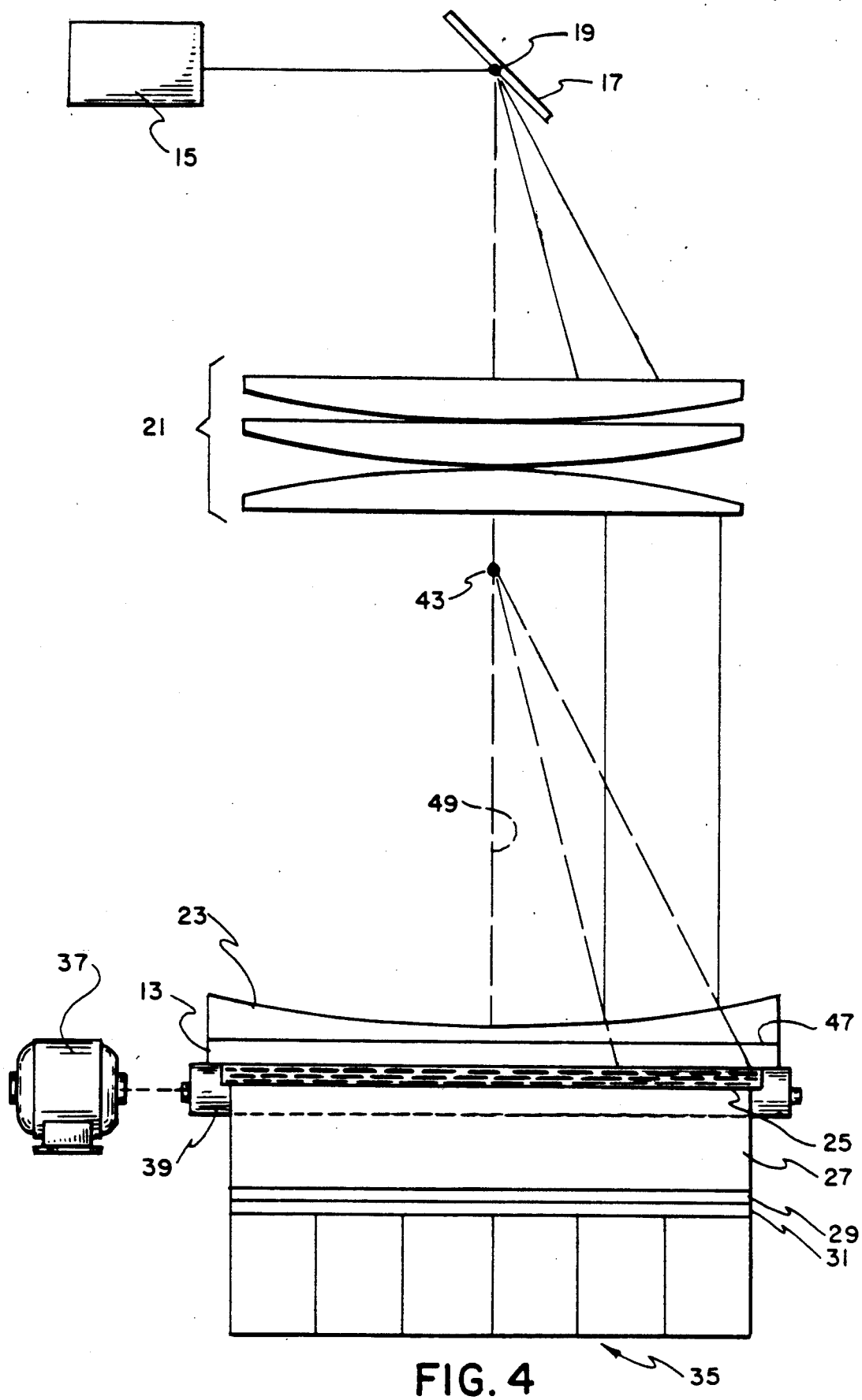
FIG. 4 is a schematic of one of the apparatus of the present invention.

With reference to FIG. 4, scanning system 11 for scanning transparent phosphor 13, includes a source of scanning radiation 15, a rotating mirror 17, a telecentric lens system 21, a diverging optical element 23, an optical coupling liquid 25, a light bar 27, filters 29 and 31 and a photomultiplier tube (PMT) array 35. A conventional sheet drive mechanism, including motor 37 and drive roller 39 is used for moving phosphor 13 and element 23 in the page direction, also known as the slow scan or y direction.

Transparent phosphor 13 comprises a photostimulable phosphor material dispersed in a polymeric binder. The polymeric binder is selected such that its index of refraction matches that of the phosphor at the stimulating wavelength $\lambda_2$, but does not necessarily match that of the phosphor at the emitted wavelength $\lambda_3$. See U.S. Pat. No. 4,733,090 to C. D. DeBoer et. al. Alternately, the phosphor recording medium could be made by another process, such as described in Laser-Stimulable Transparent CsI:Na Film for High Quality X-Ray Imaging Sensor, by Tsuyoshi Kano et al., Applied Physics Letters, Apr. 28, 1986.

Source 15 is a laser which produces the scanning or stimulating beam of radiation of wavelength $\lambda_2$. As those skilled in the art will appreciate, mirror 17 is mounted, by any conventional means (not shown), for rotation about axis 19 to enable the direction of the beam to be varied to permit scanning in the line direction, also referred to as the fast scan or x direction. The beam then passes through telecentric lens system 21, which changes the direction of the beam so that it is perpendicular to the surface of transparent storage phosphor 13. The function of lens system 21 is more fully described in our cofiled application Ser. No. 414,819 entitled "Telecentric Scanning for Transparent Storage Phosphors".

To prevent the stimulating radiation $\lambda_2$ from striking phosphor 13 perpendicularly, and prevent the creation of blurred images, diverging optical element 23 is placed on phosphor 13 and moves with phosphor 13 during scanning. In some instances the phosphor 13 and element 23 may be cemented together. Element 23 is designed so that its focal point 43 (FIG. 4) is in the same location, relative to phosphor 13, as was the tube anode 45 (see FIG. 1) relative to phosphor 13 during the x-ray exposure step. The centerline 45 of element 23 is coincident with the centerline of phosphor 13, as illustrated in FIG. 4. The radius of curvature R of lens 23 is:

$$R = \left[\frac{(n-1)}{n}\right]L$$

where n is the index of refraction of element 23 and L is the anode-to-detector distance. As an example, if n=1.5 and L=80 cm, then R=26.67 cm. The indices of refraction of the diverging element 23 and phosphor 13 should be matched at the wavelength $\lambda_2$ of the stimulating radiation, to minimize internal reflections of the stimulating radiation at the lens-phosphor interface. Additionally, element 23 should be ground and polished, or otherwise manufactured, so as to avoid scratches and imperfections, which will scatter light and, thus, cause defects in the image produced.

As is evident from FIG. 4, diverging optical element 23 causes the stimulating radiation $\lambda_2$ to diverge from the same point in space during photostimulation, as the source of x-rays previously did during the formation of the latent image in transparent storage phosphor 13.

Preferably a dichroic layer 47 is placed between optical element 23 and phosphor 13, which reflects the stimulated luminescence, wavelength $\lambda_3$, and transmits the stimulating radiation $\lambda_2$.

Diverging optical element 23 will change the optical path length of the stimulating radiation $\lambda_2$, depending on the radial distance out from the centerline 49. This will change the focal position of the laser spot which will, in turn, change the scanning spot size as a function of radial distance. This undesirable effect can be compensated for by the optical design of telecentric scanning lens system 21.

As is also evident from FIG. 4, system 11 also includes apparatus to effectively transfer the stimulated radiation $\lambda_3$ from phosphor 13 to PMT array 35. As is more fully described in U.S. Pat. No. 4,778,995 to R. W. Kulpinski et al, this may be accomplished by optical coupling 25 and light bar 27. Optical coupling 25 is a layer of fluid having an index of refraction the same as light bar 27 and phosphor 13, all at the luminescent emission of wavelength $\lambda_3$. Filters 29 and 31 function to absorb stimulating wavelength $\lambda_2$ while passing the stimulated wavelength $\lambda_3$ through to PMTs 35.

We have recognized that two axis beam scanning from a point fixed relative to the phosphor medium, if the fixed point is designed to be in the same location, relative to the phosphor medium, as was the tube anode 45 (FIG. 1) during the x-ray exposure step, will also solve the above described problem of blurred images. Alternate embodiments are schematically illustrated in FIGS. 5 and 6.

With reference to FIG. 5, scanning system 51 includes laser 53, first galvanometer 55 and first galvanometer mirror 57, second galvanometer 59 and second mirror 61 and flat field lens system 63. The transparent phosphor is again identified by 13. The laser beam, having principle axis 67, is deflected in the x and y directions by mirrors 57 and 61 before the spot is focused on phosphor 13 by lens system 63. The axes of rotation of mirrors 57 and 61 are at right angles to each other. The design of lens system 63 and the positioning of mirrors 57 and 61 must be such that, relative to phosphor 13, the beam will scan from a point 69 above lens system 63 and along its principle axis 64, which is in the same location relative to phosphor 13 as was the tube anode 45 during the x-ray exposure step.

Scanning system 71, illustrated in FIG. 6, includes laser 73, dynamic focusing telescope 75, resonant galvanometer 77 and galvanometer 79. Telescope 75 includes fast focus lens system 81 and slow focus lens system 83. Resonant galvanometer 77, which scans in the fast direction includes mirror 84. Galvanometer 79, which scans in the slow direction, includes mirror 85. Telescope 75 is disclosed in greater detail in "Two mirror, two axis, rapid frame rate galvanometer scanning using a novel resonant scanner/dynamic focusing mechanism", A. C. Mecklenberg, General Scanning, Inc., Watertown, Mass. For the purpose of our invention, the laser beam, having principle axis 87, must diverge from point 89, on axis 91 (which is perpendicular to phosphor 13) above mirror 85, which is in the same location relative to phosphor 13 as was tube anode 45 during the x-ray exposure step.

The above-described apparatus has the advantage that it permits the use of relatively thick optically transparent phosphor storage media, while achieving both high resolution (MTF) and high SNR, and eliminating blurred images. This, in turn, permits higher gain and the ability to form images with less x-radiation dosage to the patient. Additionally, the apparatus illustrated schematically in FIG. 5 and 6 eliminates the need to move the phosphor in the slow scan direction.

Whereas the drawings and accompanying description have shown and described the preferred embodiments of the present invention, it will be apparent to those skilled in the art that various changes may be made in the form of the invention without effecting the scope thereof.

We claim:

1. Apparatus for scan-stimulating an optically transparent image-storing phosphor to stimulate luminescence from those portions of the phosphor previously exposed to x-rays emanating from an x-ray source located a predetermined distance from said phosphor, said apparatus including
    (a) means for producing a beam of stimulating radiation;
    (b) means for scanning said beam along a linear scan path;
    (c) a telecentric lens system positioned in said scan path for directing said beam toward said phosphor so that said beam would impinge said phosphor at all points along a linear scan line from a direction perpendicular to said scan line; and
    (d) a negative optical element positioned between said telecentric lens system and said phosphor for controlling the angle at which said beam impinges said phosphor along said scan line so that said beam appears to said phosphor to emanate from a point located at said predetermined distance from said phosphor.

2. The apparatus of claim 1 wherein said optical element comprises a plano-concave lens.

3. The apparatus of claim 2 wherein the radius of curvature of said optical element is $$R = \left[ \frac{(n-1)}{n} \right] L.$$

wherein n is the index of refraction of said optical element and L is the perpendicular distance between said phosphor material and the source of said x-rays used to form the latent image in said phosphor material.

4. The apparatus of claim 3 wherein n, the index of refraction of said optical element, is matched to the index of refraction of said phosphor material at the wavelength of said stimulating radiation.

5. The apparatus of claim 4, further including a dichroic filter, said filter being placed between said optical element and said phosphor material.

6. The apparatus of claim 1 wherein said negative optical element is operatively coupled to said phosphor.

7. The apparatus of claim 1 wherein drive means are provided for moving said phosphor and said negative optical element in a direction perpendicular to said linear scan line.

* * * * *